Patented Feb. 24, 1942

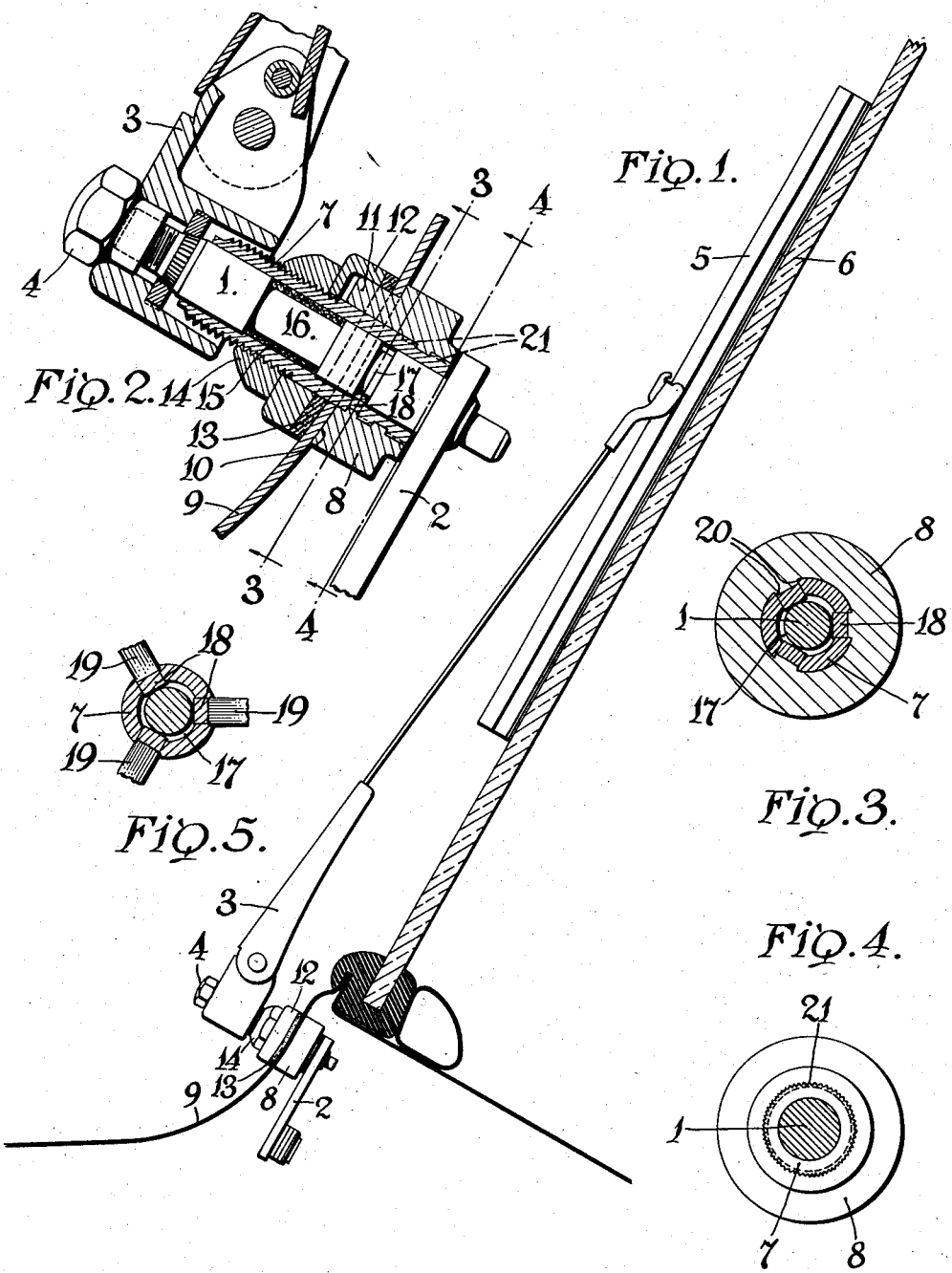

2,274,286

UNITED STATES PATENT OFFICE 2,274,286

SHAFT BEARING

Frank H. Wieland, Buffalo, N. Y., assignor to Trico Products Corporation, Buffalo, N. Y.

Application May 31, 1940, Serial No. 337,998

7 Claims. (Cl. 308—161)

This invention relates to a shaft mounting and method of forming the same and has particular reference to the mounting of a rotating shaft in a bearing sleeve, the primary object of the invention being to provide a novel interlock between the two, whereby the shaft is constrained against longitudinal or axial movement in its support.

In the mounting of small shafts, as for example the wiper actuating shaft of a windshield cleaner for motor vehicles, it has heretofore been customary to provide the sleeve with a chordal slot and passing through the slot a key member to engage a groove in the shaft. This exposes the key member to unauthorized displacement and also permits the ingress of foreign matter into the bearing as well as the escape of any lubricant therefrom which may have been initially supplied the unit.

The present invention has for its aim to provide a practical and efficient shaft mounting in which a sealed interlock is provided between the shaft and its mounting sleeve to secure the two in a permanent and tamper-proof manner.

In the accompanying drawing

Fig. 1 is a fragmentary side elevation of a windshield cleaner as depicting one embodiment of the present invention;

Fig. 2 is a longitudinal sectional view through the shaft support more clearly illustrating the present invention;

Fig. 3 is a transverse sectional view through Fig. 2 about on line 3—3.

Fig. 4 is a similar view on line 4—4 of Fig. 2; and

Fig. 5 is a detailed sectional view exemplifying the manner of forming the interlock.

Referring more particularly to the drawing, the numeral 1 designates a shaft which in the present illustration is a part of the windshield cleaner mechanism of a motor vehicle, although the invention is not restricted to this use. In such use the shaft may have fixed upon its inner end an arm 2, connectible to a source of power, and on its outer end a wiper actuating arm 3 secured by a clamping nut 4 and serving to reciprocate the wiper 5 over the windshield 6.

The shaft 1 is journaled in a bearing sleeve 7, about the inner end of which is cast a supporting body portion 8 to facilitate the mounting of the sleeve on the cowl 9 or other support. The body portion 8 has a seating face 10 disposed against the inner side of the cowl and also a lug 11 which together with the bearing sleeve and the shaft project through an opening in the cowl. A cap plate 12 receives the protruding lug 11 and seats on a gasket 13 at the front side of the cowl, being clamped against the outer face thereof by a nut 14 which is threaded on the sleeve 7. This unit is interlocked with the cowl by the lug 11 against rotation in the cowl opening. A lubricant containing felt 15 fitting in a groove 16 about the shaft 1 supplies the bearing with the required lubricant.

In accordance with the present invention the shaft 1 is provided with a peripheral groove 17 designed to receive one or more key members 18 pressed or struck inwardly from the enclosing sleeve 7. These key members may be conveniently struck inwardly by suitable punches 19 having a width slightly less than that of the groove 17 so that the latter will serve in the capacity of a die part to receive the key member 18 when pressed from the sleeve. The expressing end of each punch 19 is preferably rectangular in cross section and formed with a flat face, and consequently the key member struck from the sleeve will be in the form of a rectangular body presenting a substantially flat face more or less tangential to the bottom of the groove, as shown in Figs. 3 and 5. This produces a key part of chordal extent which serves to restrain the shaft against axial or longitudinal movement within its bearing sleeve.

When these key members are struck-in a shearing action takes place, the individual members being broken from the body of the bearing sleeve by reason of the coaction between the punches 19 and the die serving groove 17. The key members are, however, frictionally retained in their recesses to secure the shaft in position. Following this striking operation, the inherent resiliency of the metal will serve to remove the key members from direct bearing contact on the bottom of the groove 17 as well as against any objectionable friction on the side walls of the groove which might tend to retard free rotation of the shaft. Therefore, while the two elements 1 and 7 are restrained against relative axial movement they are, nevertheless, free to rotate one upon the other.

To permanently seal the key members in their operative positions the mounting body portion 8 is cast about them and therefore its metal will flow into the recesses 20 and lend solid support to the key members, as shown more clearly in Figs. 2 and 3.

The unit having once been completed, the shaft is permanently sealed against being tampered with. The flowing metal of the body portion 8 when cast about the sleeve 7 will interlock itself with the walls of the recesses 20, and if desired, a further securement may be provided by forming a series of serrations 21 exteriorly on the sleeve.

The interlock is obtained in a practical manner and permanently sealed by the die casting or otherwise forming of the mounting body portion 8. The manufacture of the unit is readily accomplished and therefore adapts itself to mass production.

While the foregoing description has been given in great detail it is to be understood that the inventive principles herein involved are applicable to other forms of the invention without departing from the spirit and scope defined in the following claims.

What is claimed is:

1. A shaft mounting comprising a shaft, a bearing sleeve providing journal support therefor, the sleeve having a part pressed into interlocking relation with the shaft to permit rotative movement while restraining axial movement relative to each other, and a mounting body portion cast about the sleeve and about the pressed-in part thereof to give support to the interlock.

2. A shaft mounting comprising a shaft, a bearing sleeve providing journal support therefor, the sleeve having a key member pressed inwardly therefrom into interlocking relation with the shaft against relative axial displacement, the key member consisting of a body substantially sheared from the sleeve and frictionally held thereby in its operative position, and a body portion embracing the sleeve and having a part entering the surface recess left by the formation of the key member, such entering part backing up the key member to give support thereto.

3. A shaft mounting comprising a shaft, a bearing sleeve providing journal support therefor, the shaft having a peripheral groove and the sleeve having key members pressed therefrom into the groove to interlock the shaft and sleeve against relative axial movement, and a mounting body portion die cast on the sleeve to fill the recesses left in the outer surface thereof by the formation of the key members and thereby lend support to the latter.

4. A shaft mounting comprising a shaft, a bearing sleeve providing journal support therefor, the sleeve having a part pressed into interlocking relation with the shaft to permit rotative movement while restraining axial movement relative to each other, and a mounting body portion cast about the sleeve and about the pressed-in part thereof to give support to the interlock, the pressed-in sleeve part having an inner face extending substantially in a tangential relation to the shaft.

5. A shaft mounting comprising a shaft, a bearing sleeve providing journal support therefor, the sleeve having a part pressed into interlocking relation with the shaft to permit rotative movement while restraining axial movement relative to each other, and a mounting body portion cast about the sleeve and about the pressed-in part thereof to give support to the interlock, said sleeve having a projecting portion screwthreaded, and a clamp nut engaged with such projecting portion and cooperable with the cast body portion to secure the shaft mounting in position.

6. A shaft mounting comprising a shaft having a peripheral groove, and a bearing sleeve providing journal support for the shaft, the sleeve having a key member pressed inwardly therefrom to extend into the groove for interlocking the shaft against axial displacement, the key member consisting of a slug substantially sheared from the sleeve and frictionally held thereby in its operative position.

7. A shaft mounting comprising a shaft having a peripheral groove, and a bearing sleeve providing journal support for the shaft, the sleeve having a key member displaced inwardly therefrom to extend into the groove for interlocking the shaft against axial displacement, the key member consisting of a block-like slug substantially sheared from the sleeve and having opposite side walls and opposite end walls frictionally held by the sleeve for supporting the block-like slug in its operative position.

FRANK H. WIELAND.